Figure 1:
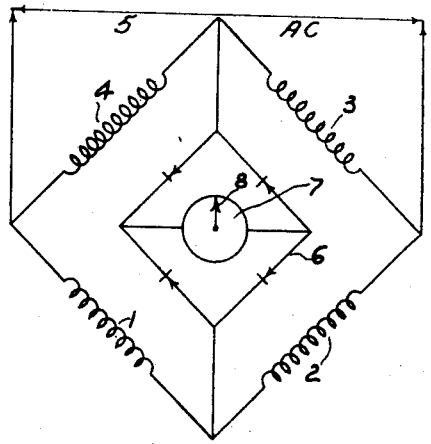

April 11, 1950 — W. A. GIESEKE — 2,503,720
GAUGING METHOD AND DEVICE
Filed Dec. 4, 1944 — 2 Sheets-Sheet 1

INVENTOR.
WERNER A. GIESEKE
BY Benedict & Swartwood
ATTORNEYS

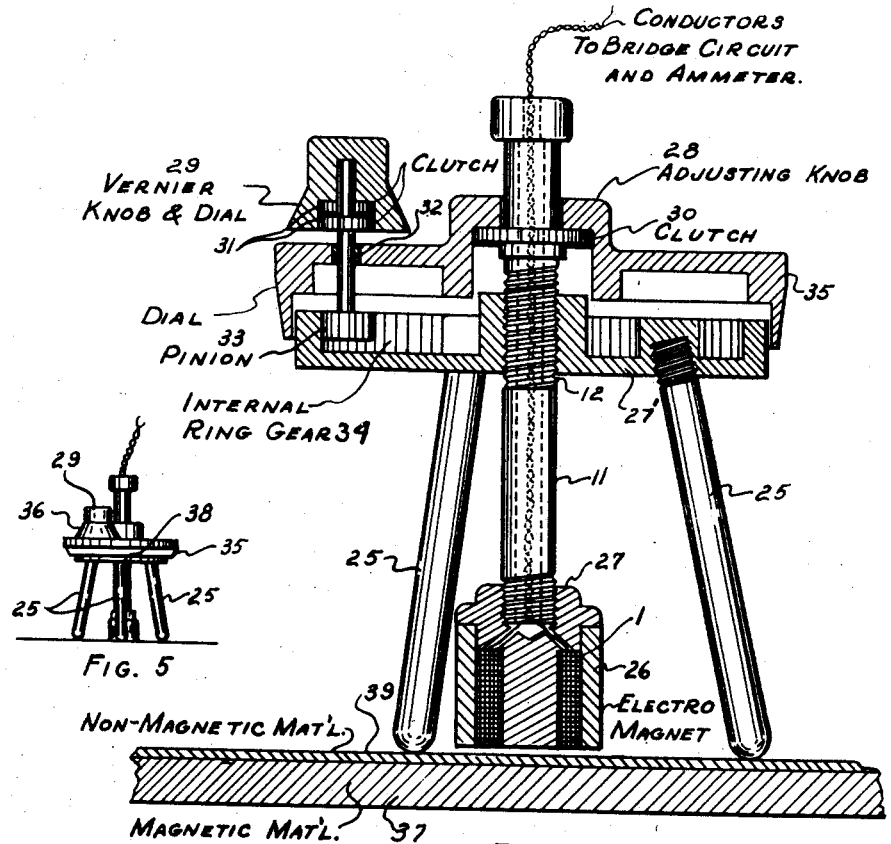
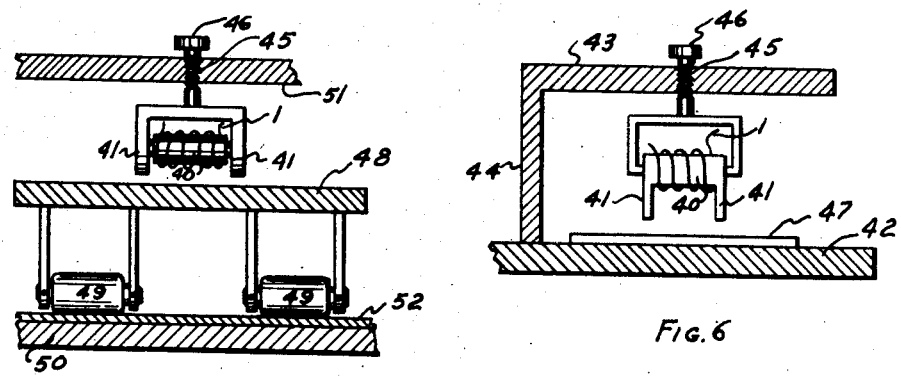

Patented Apr. 11, 1950

2,503,720

UNITED STATES PATENT OFFICE 2,503,720

GAUGING METHOD AND DEVICE

Werner A. Gieseke, Danville, Ill., assignor to Samuel C. Hurley, Jr., Danville, Ill.; Wilmina L. Hurley, executrix of said Samuel C. Hurley, Jr., deceased, assignor to Wilmina L. Hurley, Danville, Ill.

Application December 4, 1944, Serial No. 566,454

1 Claim. (Cl. 175—183)

This invention relates to methods and apparatus for gauging material and particularly for gauging sheet material.

A broad aspect of my invention comprises providing an improved method and apparatus for gauging of the thickness of materials either by direct measurement, indirect gauging, gauging against a standard of thickness comparison, and other specific gauging procedures, but in all cases establishing a predetermined air gap independent of the standard of thickness comparison or the thickness of the material gauged and then making all measurements based on the establishment of the predetermined air gap.

One of the broad objects of my invention is to provide an improved method and apparatus for the electro-magnetic gauging of materials wherein the change in flux resulting from variations in the air gap due to variations in thickness of material is used as a means to measure, indicate, or control the thickness.

Another object of my invention is to provide a novel method and apparatus for the electro-magnetic gauging of both magnetic and non-magnetic materials which heretofore has been difficult if not impossible to achieve with previous methods and apparatus. Among the non-magnetic materials that may be gauged by my method and apparatus are fabrics, paper, rubber sheets, plastic sheets, impregnated materials, glass, and various non-magnetic metals such as aluminum, brass, copper, and the like. It is also useful in gauging metallic magnetic materials of all kinds.

Another object of my invention is to provide a novel method and apparatus for the continuous indication and controlling of the thickness of sheet material such as paper web wherein the thickness of the material must be controlled within a definite tolerance range.

A further object of my invention is to provide a novel method and apparatus useful in sorting sheet material according to thickness.

A more specific object of my invention is to provide a novel means in electromagnetic gauging wherein vibrations in the supporting base do not effect the results of the gauging to any substantial extent.

Another specific object of my invention is to provide a method and apparatus for obtaining direct readings in dimensional terms for which no satisfactory method and apparatus has heretofore been provided.

An important object of my invention is to provide a method and apparatus for obtaining the same sensitivity in the reading for each variation in thickness irrespective of the thickness of the material gauged.

Another important object of my invention is to provide a method and apparatus wherein the apparatus need only be calibrated once and avoids the repeated calibrations for each standard of thickness comparison.

A further important object of my invention is to provide means which avoid calibration of the instrument for each composition of the shunt; that is, the apparatus itself provides a shunt which is independent of the support upon which the material to be gauged rests.

A more specific object of the invention is to provide an improved method and apparatus for obtaining the zero or starting point from which variations in flux due to variations in width of the air gap are measured.

In the continuous measuring, indicating, recording, or controlling of thickness of sheet material wherein it was desired to control the thickness within certain predetermined limits of tolerance, various methods have been used and none have been found satisfactory since in previous devices the sensitivity varied as the width of the air gap varied and the sensitivity was different for the same change in thickness depending upon the thickness of the material with which the material gauged was compared. This resulted in either inaccuracies in the gauging or necessitated the calibration of the instrument to determine the relationship for variations in the flux resulting in variations of the material for each standard of thickness comparison. In my apparatus and device, the variation in the flux due to the variations in the thickness of the air gap caused by variations in the thickness of material is always the same regardless of the standard of thickness comparison or, in other words, is independent of the standard of thickness comparison whereas in other devices it was dependent on the standard of thickness comparison.

I accomplish this by always obtaining the same predetermined air gap regardless of the standard of thickness comparison, and thus variations in the air gap due to changes in thickness of the material necessarily results in the same change in the amount of flux. One way within the broad principles of my invention to accomplish this result, for example in the gauging of paper web, is by selecting a predetermined air gap equal to the largest size paper web to be gauged, and calibrating or determining the current resulting from the flux caused by definite changes in thickness within the tolerance range. For example, in testing paper web, if the largest size web to be gauged is a 100 point web, 100 points being equal to 1/10 of an inch, and it is desired to measure or control the thickness within a plus or minus 1 point range, the air gap is adjusted to a predetermined width of 100 points. In a modified procedure the air gap may be set for 101 points and the instrument calibrated between 99 and 101 points. An electro-gauging magnet may be embodied in a usual type of bridge circuit, although other types of circuits may be used for measuring the amount of current created by the flux. The recording, measuring, indicating or controlling device is then set for the zero or starting point for the air gap of 100 points. The air gap is used in the usual sense and is the distance between the metallic shunt portion of the electromagnet and the poles of the magnet, or, in some cases, the gauging head. In this particular application of my device, the entire portion of the device involving the gauging magnet rides or floats on the material to be gauged and the air gap is therefore the distance between the poles of the gauging magnet and the metallic shunt support, irrespective of whether or not the gauging material is in gauging position.

In operation, suppose, for example, it is desired to measure and control the thickness of a 50 point paper within a tolerance range of plus or minus 1 point. A thickness of standard comparison exactly equal to 50 points is placed under the magnet which provides an air gap equal to 50 points. The instrument for measuring or controlling the variation of thickness is then set for the zero or starting point by raising the magnet until the zero point is the same as for a 100 point paper, which is equal to the predetermined and previously established air gap of 100 points for the maximum sized web to be gauged. The apparatus is now ready for gauging of the material and variations in the thickness of the material will cause a variation in the width of the air gap which results in variation in flux which may be measured by a current reading instrument. It is obvious from the above explanation that by using my method and device, variations in thickness, which must be controlled within a definite tolerance range, will result in the same variation in air gap or flux irrespective of the standard of thickness comparison or irrespective of the actual thickness of the material to be gauged. This results in the same sensitivity or the same reading on the indicating instrument for the same change in thickness because the same air gap is initially established for each standard of thickness comparison irrespective or independent of the standard of thickness comparison and therefore the variation of thickness is measured as if standard of thickness comparison were always the same. In previous methods and devices, the standard of thickness comparison was placed in the device and a zero point obtained for an air gap corresponding to the standard of thickness comparison and not for a predetermined or previously established air gap against which the device was calibrated. This was unsatisfactory because, for example, in the previous devices, if the standard of thickness comparison was equal to 5 points, a 1 point variation in thickness would result in about 150 microamperes change in the current due to the flux. For a 25 point standard of thickness comparison, a 1 point change in thickness would result in a change of about 26 microamperes, and for a 100 point paper, a 1 point change would result in about 5 microamperes. Thus it is to be seen that the sensitivity in the prior art devices changed for each standard of thickness comparison, whereas in my device I not only provide a high sensitivity since I can operate in the range providing the maximum actual change in deflection of the instrument per given amperage change, but also I have obtained the same sensitivity for every variation of thickness for material gauged regardless of the standard of thickness comparison. Thus I provide a simple, accurate, and consistent method and device for controlling the thickness of paper web and the like.

By employing my principle of adjusting the air gap to always correspond to a previously determined air gap, I also provide a simple and accurate method of determining directly in dimensional terms the thickness, employing well-known mechanical means as the direct reading instrument. Some of the mechanical means are calipers, dial gauges, and the like. For example, the predetermined air gap may be established as $1/4$ of an inch and the system balanced for the zero point. I then position the non-magnetic material to be gauged such as to widen the air gap equal to $1/4$ of an inch plus the thickness of the material. I then lower the magnet in a direction toward the non-magnetic material to be gauged until I have obtained the zero point on the instrument which is the same zero point as for a $1/4$ inch air gap and the amount of the adjustment or the lowering may be directly measured by, for example, a ring gauge and a direct reading in inches is obtained. In effect, I thus provide a magnetic reference point for directly gauging the thickness of a non-magnetic material on a magnetic material and all I need to know is the type of magnetic shunt for calibrating the instrument. The direct reading type of device has many applications but is especially adaptable for spot checking the thickness of a magnetic material or a non-magnetic material to determine the exact thickness. For example, to determine a lacquer coating on metal, all I need to know is the kind of metal, which in this case is the shunt, calibrate the instrument for such metallic shunt for a predetermined air gap, and then place the instrument on the lacquer covered metal and adjust the instrument until I obtain the same zero reading as for the predetermined air gap and directly read by the mechanical indicator in inches the thickness of the lacquer material. It is obvious that such a device has many uses and I know of no prior art device which would permit such use. Furthermore, in the case of measuring the thickness of a magnetic material, instead of adjusting the air gap in the direction of the material being measured to establish a predetermined air gap, I adjust the magnet away from the magnetic material being gauged to establish the predetermined air gap and by measuring the amount of the adjustment, I can obtain directly the thickness of the magnetic material and I know of no prior device which would accomplish this result.

In one of the broad embodiments of my invention, I employ a method and device which measures the air gap between the support for the material to be gauged, which is the shunt for providing easy travel for the lines of flux, and the inductance coil. In an important modification of the above within the broad principles of my invention which involves the establishing of a previously determined air gap as the step in a method of determining the thickness, I provide a means for letting a fixed metallic shunt material float or ride on the material to be gauged. Above the fixed shunt riding on the material, I provide an inductance coil for the electromagnet which may be adjusted in relationship to the supported shunt for obtaining the predetermined air gap which may be used either to directly read the thickness in inches or may be used as a starting point for controlling or recording variations in a continuous manner as previously described for continuously controlling the thickness of paper web.

The above are illustrative of methods and procedures which may be used in employing my invention and it is obvious that there are many other uses employing the basic principle of making all measurements based on a predetermined air gap.

In one broad aspect, my invention comprises a method for determining the thickness of a material using an electro-magnet by determining the adjustment required to establish a predetermined width of an air gap for the electro-magnet.

Figure 2:
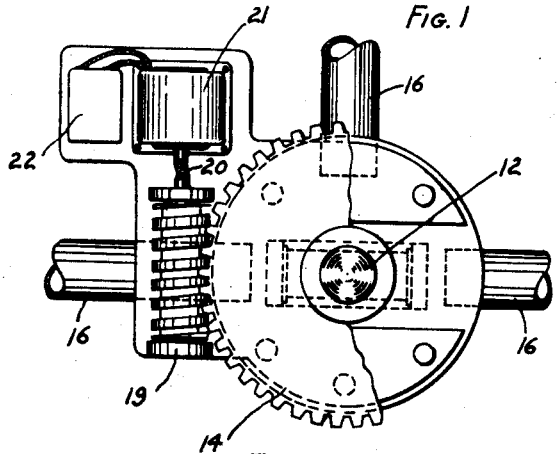
Figure 3:
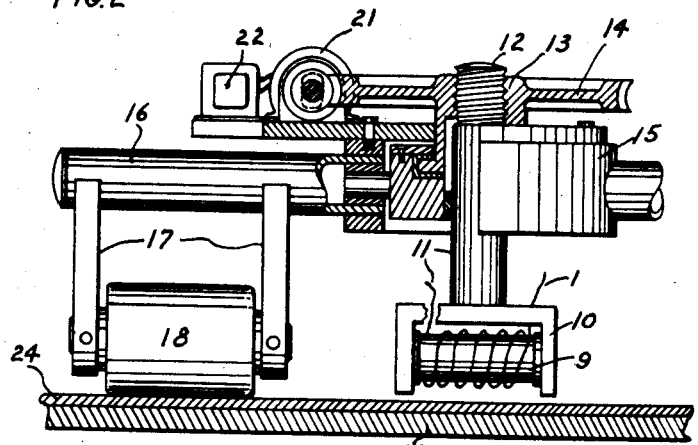

Other advantages, objects, uses, and embodiments of my invention will become apparent by referring to the drawings in which Fig. 1 illustrates a wiring diagram and the instrument used for measuring the change in flux in amperes, i. e., the current responsive means for determining the amount of the flux. Fig. 2 is a plan view of one device suitable for use in my procedure for either raising or lowering the electro-magnet as it rides upon the material to be tested. Fig. 3 is an elevation of the device shown in Fig. 2. Fig. 4 illustrates one device for obtaining a direct reading in inches of the thickness of the material gauged. Fig. 5 illustrates one way of determining the thickness of a magnetic material using the principles of my electro-magnet. Fig. 6 shows one method for the use of my device for gauging the thickness which incorporates a gauging shunt or gazing armature which may be used irrespective of the metallic support which in previous devices was used as a shunt.

Figure 7 illustrates one method and apparatus for gauging both magnetic and non-magnetic materials and has the advantage in that the shunt is always of the same material and the device does not have to be calibrated for different supporting or shunt materials as, for example, must be done in the method and apparatus illustrated in Figure 6.

Fig. 1 illustrates one method of interpreting the results of the gauging operation, and provides suitable means for determinating the variation in the flux. It is understood that this particular arrangement is only one of many which may be used within the principles of my invention. Other arrangements may be used including telemeters, recorders, relays, automatic thickness controlling apparatus and the like.

A bridge circuit is provided containing reactance coils 1, 2, 3, and 4, connected to a source of alternating current potential 5. A connection is made across the bridge circuit including a copper oxide rectifier 6 which is a well-known type of rectifying means to change the alternating current into direct current, although other types of suitable rectifiers may be used. A current responsive means such as an ammeter is provided to measure the current flowing across the bridge circuit when the bridge is unbalanced. When the bridge is in balance, no current will flow across the bridge. The reactance coil 1 is the coil 1 indicated in Fig. 3, which is inductively associated with the core of the gauging magnet 10. The reactance coils 2, 3, and 4 are used to balance the bridge circuit. Reactance coils 2, 3, and 4 are preferable over resistance elements, although they may be used. When the bridge is in balance, the needle 8 of instrument 7 is at the zero point as indicated and any change in flux created by the electro-magnet will cause an unbalance in the arm of the bridge in which is connected the inductance coil 1 of magnet 10 and the needle will be deflected and will indicate the extent of the change in flux in milliamperes. In place of the ammeter 8, especially in continuous paper checking apparatus, a device may be used for controlling the thickness of the paper web by means of such change in flux as indicated by the bridge circuit. While I have shown a bridge circuit, other circuits may be used for accomplishing the same results within the scope of my invention.

Figs. 2 and 3 illustrate a particularly novel device for accomplishing the objects of my invention. This device provides a means for supporting the electromagnet to ride or float on the non-magnetic material to be gauged. The material being gauged rests on a magnetic support which acts as a gauging shunt or armature or, in other words, completes the magnet to provide for a path for the lines of force or the flux. A core 9 has coil 1 inductively associated with it which is the coil 1 in the bridge circuit, as shown in Fig. 1. The core provides the means for creating the flux for the magnet which is attached to the shaft 11 and threaded at the upper end 12 to engage the female threads 13 of the gear member 14. The shaft 11 is enclosed in guiding housing 15 to guide it in its up and down motion. The entire device rides upon the material to be gauged through a tricycle arrangement including arms 16 to which are attached, through members 17, rollers 18. Although rollers are preferable since they provide the minimum of friction and therefore wear, shoes, slides, ball bearing elements, and similar means may be used. The teeth in the gear 14 mesh with the gear 19 which is connected by the connection 20 to a positive driving means which may be a synchronous motor 21. A control 22 for the motor 21 is provided to reverse the direction of the motor and to control the operation of the motor 21.

While it is not intended to limit my invention, I will describe the operation of Figs. 1, 2, and 3 in connection with the measurement of paper web. Assume that the largest thickness of paper web is equal to 100 points and the tolerance range is plus or minus one point. The air gap is measured between the poles of magnet 10 and the supporting magnetic shunt 23 and the width of the air gap is adjusted by the operation of the motor 21 by the control 22 until the air gap equals 100 points or $\frac{1}{10}$ of an inch as measured by any suitable means or by use of a standard of thickness comparison. The bridge in Fig. 1 is balanced by varying the capacity of the inductance coils 2, 3, and 4 and the indicator 8 of the instrument 7 is set at zero. The instrument 7 is calibrated over the 1 point plus or minus range and indicator 8 of the instrument 7 indicates changes in thickness plus or minus according to deviations from the zero point. The instrument 7 or a similar device may be used to actually control the thickness of the paper within the tolerance range. Now assume that it is desired to check a 50 point paper web within plus or minus one point range. A standard of thickness comparison is placed under the rollers 18 equal to 50 points or .05 inch and the magnet 10 is lowered by the rotation of the gear 14 through the gear 19 and the synchronous motor 21, as controlled by the control means 22, until the needle 8 of the instrument 7 again registers zero which means that even though a 50 point standard of thickness comparison is used, the air gap is equal to 100 points or is the same as if the standard of comparison were 100 points. Similarly, if it were desired to check a 25 point paper within a tolerance range, the same procedure would be followed and the air gap adjusted until instrument 7 registers zero which would again be equivalent to an air gap of 100 points even though a 25 point paper was to be checked. Thus the same air gap is maintained regardless of the standard of thickness comparison against which the paper web is to be measured, resulting in the same starting point and the maintainance of the same sensitivity irrespective of the standard of thickness comparison.

After the air gap has been adjusted to equal 100 points for a standard of thickness comparison equal to 50 points, the device is ready to function for testing the paper web 24, passing under the rollers 18, and checked by the amount of flux passing through the air gap or material 24 from the magnet 10 to the shunt 23 causing variations in the air gap due to the variations in thickness of the paper. The variations in flux will be reflected in the current flowing through the coil 1 inductively associated with the core 9 which will unbalance the bridge circuit in Fig. 1 and the change in thickness due to the change in flux will be indicated by the instrument 7 of Fig. 1 and by proper use of automatic paper thickness control equipment can also control the thickness of the paper web.

It is also apparent that the same procedure, method, and device can be used for sorting non-magnetic materials according to a predetermined standard of thickness comparison by the proper use of suitable sorting equipment controlled by the bridge circuit of Fig. 1. It is also apparent that in addition to providing a continuous indicator, sorter, or controller that the device of Figs. 1, 2, and 3 can be used to directly indicate the thickness of a non-magnetic material. For example, this may be done as follows: With the rollers 18 resting on the magnetic support 23, the air gap is adjusted to a predetermined distance. Then material to be gauged is placed under the rollers 18 and the electromagnet lowered until the zero reading of instrument 7 is again obtained which means that the same air gap is obtained. By employing usual precision instruments, for example a dial gauge operatively connected (but not shown) to shaft 11, the thickness of the non-magnetic material can be directly indicated. In other words, by this scheme, I provide a magnetic reference point whereas previously in the use of mechanical gauges it was necessary to use a mechanical reference point and it is obvious that by use of a magnetic reference point as described by me that not only a more accurate reading can be obtained but also readings obtained where it is not feasible nor desirable to provide a physical or mechanical reference for the mechanical means of directly reading the thickness of the non-magnetic material in terms of inches.

Fig. 4 illustrates one particular device for accomplishing the direct reading measurement just described. Whereas the device shown in Fig. 2 and Fig. 3 is particularly applicable to continuous measurements and continuous control of the thickness of a material, the device illustrated in Fig. 4 is particularly applicable to spot checking the thickness of material and for obtaining a direct reading in inches. Again, a tricycle arrangement is provided as shown in Figs. 4 and 5 and legs 25 are provided for the support. The electromagnet 26 containing coil windings 1 which are similar to the coil windings 1 of Fig. 3 are provided. The inductance coil 1 for the Figs. 4 and 5 may be connected in a bridge circuit similar to that shown in Fig. 1. The shaft 11 is threaded at the upper end with threads 12 and connected to the housing 27 at the lower end. The upper threaded end 12 engages the female threads in the ring member 27' whereby the electro-magnet 26 may be raised or lowered. The electromagnet 26 is raised or lowered by the adjusting knob 28. The adjusting knob 28 provides a rough approximate adjustment and the vernier knob 29 provides for the precise adjustment. A clutch 30 engages the adjusting knob 28 with the shaft 11 and the clutch 31 engages the element 32 to which is attached the pinion 33, said pinion engageably arranged with the internal ring gear 34. A dial 35 is attached to the adjusting knob 28 and a vernier dial 36 is attached to the adjusting knob 29. One operation of the device shown and illustrated in Figs. 4 and 5 is as follows: With the legs 25 of the tripod resting directly on the magnetic shunt 37, the adjusting knobs 28 and 29 are adjusted to obtain a predetermined air gap and the bridge circuit balanced and the zero reading on the instrument 7 of Fig. 1 is obtained. Adjusting knobs 28 and 29 are now declutched by means of clutches 30 and 31 so as to disengage the dials 35 and 36 and the zero setting is made at 38, as shown in Fig. 5. The instrument is now ready to measure the thickness of the non-magnetic material. The non-magnetic material 39 to be measured is placed on the support 37 and the tripod legs 25 placed directly on the non-magnetic material 39. By adjusting the knobs 28 and 29 to lower the electromagnet, the same air gap is obtained as previously established, and when the needle 8 of indicator 7 of Fig. 1 reaches the same zero point as the zero point previously established for the predetermined air gap, the actual thickness in inches of the non-magnetic material may then be read from the dials 35 and 36. Thus by the use of the principle of my electromagnet, I establish a magnetic reference point for directly reading the thickness of a non-magnetic material. In the use of the electromagnet, the composition of the shunt 37 will, of course, vary the original setting and the balancing of the bridge circuit shown in Fig. 1. In the operation just described, the original balancing of the bridge circuit for a predetermined air gap is readily established. However, for measuring the thickness of lacquer on metal cans, it is only necessary to know the kind of metal used in the can in order to establish the original zero setting for the bridge circuit in Fig. 1 in order for a predetermined air gap to be established, and by merely placing the tripod with the leg 25 on the can and by adusting the knobs 28 and 29 until the same zero point for the bridge circuit shown in Fig. 1 is obtained, the direct reading may be accomplished. In Figs. 4 and 5, a specific apparatus is shown illustrating the principles of my invention for gauging sheets of material and it is within the scope of my invention to adapt the apparatus to round surfaces and the like.

Fig. 6 illustrates a method for determining the thickness of a magnetic material using an electromagnet. Coil 1 is inductively associated with the core 40 to which is connected the magnet 41. The coil 1 may be embodied in a bridge circuit to obtain the initial zero reading as previously described. Fig. 6 illustrates one method and apparatus for determining the thickness of magnetic materials by using the principles of my method. A metallic support or shunt 42 is provided and should be of the same composition as the magnetic material being tested. Arm 43 is fixedly attached to the support 42 through the element 44. A threaded member 45 is fixedly attached to the core 40 and engages female threaded members in the arm 43 and by turning the knob 45, the air gap may be adjusted. In the operation of Fig. 6, the air gap, without any magnetic material 47 being in position, is adjusted to establish a predetermined air gap used as a standard of comparison and the bridge circuit of Fig. 1 is balanced and the instrument 7 is set at the zero point. The device is now ready to gauge the magnetic material and this is done by placing the magnetic material 47 in the air gap which has the effect of narrowing the previously determined air gap. The knob 46 is then turned to raise the poles 41, that is, to increase the air gap until the previously established air gap is reached, as indicated by the indicator 8 of the instrument 7 in Fig. 1. From this point on, the magnetic material may be sorted or the thickness controlled or the thickness automatically recorded by any suitable means. Furthermore, it is apparent that an arrangement for Fig. 6 similar to that previously described for Fig. 4 may be employed to directly read the thickness of the material 47.

Fig. 7 illustrates one method and apparatus for gauging both magnetic and non-magnetic materials and has the advantage in that the shunt is always of the same material and the device does not have to be calibrated for different supporting or shunt materials as for example as must be done in the method and apparatus described for Fig. 6. In this operation, a shunt 48 is provided and adapted and arranged to ride on rollers 49 which may be arranged in a tripod or bicycle arrangement, as illustrated in Fig. 3. In this device, the supporting material 50 can be of any composition since it is immaterial to the operation and the function of the device. The device further has a fixed support 51 containing knob 46 threaded at point 45 for raising and lowering the poles 41 and the coil 1 inductively associated with the core 40 said coil 1 embodied in a bridge circuit similar to that shown for Fig. 1. The knob 46 is used to raise and lower the electromagnet to adjust the air gap. In operation, the rollers 49 supporting the shunt 48 are directly placed on the fixed support 50. The knob 46 adjusts the air gap to establish the predetermined air gap. The material to be measured 52 which may be either magnetic or non-magnetic material is placed under the rollers 49 which raises the shunt 48 toward the poles 41 of the electro-magnet and decreases the air gap. Therefore, to obtain the previously established air gap as a starting point, the electromagnet by means of the knob 46 must be raised and when the previously established air gap is obtained, the indicator 8 of the Fig. 1 is set at the zero point. From this point on, the device may be operated the same as that described for Figs. 2, and 3 for either measuring, indicating, sorting, checking, classifying, or controlling the thickness of sheet material or of coating materials, insulating materials, or protective coatings such as plastic, lacquer, rubber, and the like. Furthermore, by providing a device with proper dials similar to that for Fig. 4, a direct reading may be obtained in terms of the thickness of the material by measuring the adjustment required to establish the predetermined air gap.

In other words, the basic principle underlying my invention is to first establish a predetermined air gap from which all measurements are made or indicated and involves the step of always reestablishing the same air gap and either measuring the extent of the change in the width of the air gap while the material is being measured for direct readings or the reestablished air gap may be used as a starting point to indicate the fluctuations in the air gap due to the variations in the thickness of the material being measured. It is therefore understood that the specific illustrations and embodiments of my invention are not to be considered limiting but my invention is only limited by the following claim.

I claim as my invention:

The method of gauging the thickness of non-magnetic material which comprises employing a shunt of magnetic material and a gauging magnet spaced from and relatively movable with respect to said shunt, predetermining the magnitude of the spacing between said shunt and said magnet without said material in said space, placing a material of the thickness of the material to be gauged in said space thereby causing said magnet to move with respect to said shunt, adjusting the position of the magnet relative to the shunt to a distance equal to said predetermined spacing, placing the test material in said space thereby causing the magnet to move with respect to said shunt, and determining variations from said desired thickness by the change in flux of the magnetic field as compared with the flux at said predetermined spacing without the material in the field.

WERNER A. GIESEKE.

REFERENCES CITED

The following references are of record in the file of this patent:

UNITED STATES PATENTS

| Number | Name | Date |
| --- | --- | --- |
| 1,925,904 | Mayne | Sept. 5, 1933 |
| 1,989,037 | Brown | Jan. 22, 1935 |
| 2,058,518 | Schuster | Oct. 27, 1936 |
| 2,215,148 | Ehrler et al. | Sept. 17, 1940 |

OTHER REFERENCES

Electronics, pages 156 and 160, Nov. 1943.